United States Patent [19]
Katoh

[11] Patent Number: 5,748,477
[45] Date of Patent: May 5, 1998

[54] VEHICLE COLLISION CONTROL SYSTEM

[75] Inventor: Shigeru Katoh, Tokyo, Japan

[73] Assignee: Takata Corporation, Tokyo, Japan

[21] Appl. No.: 574,553

[22] Filed: Dec. 19, 1995

[30] Foreign Application Priority Data

Dec. 20, 1994 [JP] Japan .................... 6-335538

[51] Int. Cl.$^6$ .................... G08G 1/16; B60T 7/22
[52] U.S. Cl. .................... 364/461; 364/424.055; 364/426.01; 340/435; 340/436; 340/903; 280/735
[58] Field of Search .................... 364/460, 461, 364/426.01, 426.015, 424.055, 426.028, 426.041, 424.056, 424.057; 240/903, 901, 435, 436; 280/735; 180/169, 271

[56] References Cited

U.S. PATENT DOCUMENTS

| | | | |
|---|---|---|---|
| 3,835,361 | 9/1974 | Schubring | 318/561 |
| 4,146,891 | 3/1979 | Fujiki et al. | 342/71 |
| 4,308,536 | 12/1981 | Sims, Jr. et al. | 342/70 |
| 5,249,157 | 9/1993 | Taylor | 340/903 |
| 5,285,188 | 2/1994 | Yoshida | 340/436 |
| 5,410,484 | 4/1995 | Kunimi et al. | 364/426.01 |
| 5,418,727 | 5/1995 | Ikeda et al. | 364/461 |
| 5,502,432 | 3/1996 | Ohmamyuda et al. | 340/901 |
| 5,529,138 | 6/1996 | Shaw et al. | 180/169 |
| 5,541,590 | 7/1996 | Nishio | 340/435 |
| 5,572,428 | 11/1996 | Ishida | 364/461 |
| 5,594,414 | 1/1997 | Namngani | 340/436 |

Primary Examiner—Tan Q. Nguyen
Attorney, Agent, or Firm—Kanesaka & Takeuchi

[57] ABSTRACT

A vehicle collision control system has a distance measuring sensor, a collision predictive device for outputting a collision predictive signal, a deceleration calculating device for calculating a first limit deceleration allowing the vehicle to run while braking without losing its stability and a second limit deceleration for making the collision speed lower than a survival space ensuring speed, an arithmetic processing device for outputting a braking start signal upon comparing the aforementioned limit decelerations which change according to the running of the vehicle after the collision predictive signal is outputted, a braking command device for commanding a predetermined braking force to a braking device upon receiving the braking start signal, an impact sensor for sensing, and a collision signal generating device for outputting a collision occurrence signal to the logic circuit when the impact sensor senses the collision, so that an ignition signal is outputted to the inflator of the air bag device according to a logical product between the collision predictive signal and collision occurrence signal.

5 Claims, 5 Drawing Sheets

$V_2 > V_a$ $V_2 < V_a$

VEHICLE COLLISION CONTROL SYSTEM

FIELD OF THE INVENTION

The present invention relates to a vehicle collision control system and, more particularly, to a vehicle collision control system, when a vehicle, especially of small crushable zone type, comes into collision, for allowing, an occupant protective device such as an air bag device mounted on the vehicle to effectively operate by ensuring enough survival space.

DESCRIPTION OF THE RELATED ART

For protecting an occupant in a vehicle from a collision, the vehicle is provided with occupant protective devices such as a seat belt device, an air bag, device and the like.

As for the air bag device, an impact produced by the collision is sensed by an impact sensor mounted on the vehicle to ignite an inflator of the air bag, device to deploy a bag-like gas cushion, thereby restraining the forward movement of the occupant.

For preventing the air bag device from incorrectly operating, the threshold of the impact sensor is set not to sense an impact if its duration is short as applied by using a hammer or the like.

As a technique for preventing the incorrect operating of the air bag device, a technique of treating, output signals from a plurality of impact sensors by using a logic circuit has been proposed. As one of systems using, such a technique, there is an impact sensing system which generates an inflator ignition signal only when a logical product (AND) between a front sensor, positioned near the front end of the vehicle body, and a safety sensor, positioned in a diagnostic unit installed in the vehicle body, wherein the front sensor and the safety sensor are connected in series each other.

According to this system, only when an impact is sensed by the front sensor and subsequently by the safety sensor, the system decides that a collision occurs and then deploys an air bag device.

In U.S. Pat. No. 5,285,188, a vehicle collision sensing system, whereby an impact produced by an collision can be promptly sensed upon combining a collision predictive device, is disclosed.

The vehicle collision sensing device, as shown in FIG. 5, comprises a distance measuring sensor 50 positioned at the front end of the vehicle body, an impact sensor 51, analog-to-digital converters 52, 53 for converting detected signals from the sensors 50, 51 into digital signals, respectively, a control circuit 54, a differentiating circuit 55 for computing a rate of distance change based on a signal value received from the distance measuring sensor 50, an analog-to-digital converter 56 for converting an output signal from the differentiating circuit 55 into a digital signal, and an inflator operating circuit 57.

This vehicle collision sensing device decides that a collision occurs by not only performing a collision prediction but also sensing the actual collision.

That is, the collision prediction by the control circuit 54 is performed according to a logic which computes a distance D between the vehicle and the forward object sensed by the distance measuring sensor 50 and a rate of distance change ΔV in the present speed of vehicle, also considering the maximum deceleration of the vehicle, computes a distance D(t) between the vehicle and the forward object at a time t and an expected time T of collision, and generates an unavoidable collision signal when D(T)≦0 wherein D(T) is the distance at the time T.

Once the vehicle actually comes into collision and the impact is sensed by the impact sensor 51, it is decided that the sensed impact is produced by the collision because the unavoidable collision signal is already generated to the control circuit 54. Then the inflator operating circuit 57 immediately generates the inflator ignition signal. In this manner, this device can hasten the generation of the inflator ignition signal for scores of milliseconds (ms) as compared to the case of the aforementioned combination of two impact sensors. Therefore, it allows the gas generating speed of the inflator used in the air bag device to be reduced so that an inflator having lower capacity can be used, enabling the cost for the device to be reduced.

Further, since the collision is decided not only by the operation of the distance measuring sensor 50 but also by sensing the impact corresponding to the actual collision, the vehicle collision sensing device can prevent the air bag from being deployed by an incorrect decision of the distance measuring sensor when, for example, the wind blows a newspaper or the like against the front of the vehicle.

By the way, in recent years, a vehicle body is designed to have a structure which allows its kinetic energy to be emitted as slowly as possible when the vehicle comes into forward collision or the like. That is, the vehicle has a crushable zone, positioned in a front portion of the vehicle body, where energy produced by the collision can be absorbed by greatly deforming a front portion of the vehicle body. The crushable zone absorbs impact applied to a vehicle cabin, where the occupant is in, by controlling the deformation of vehicle body, and increases the strength and stiffness of the vehicle cabin to ensure a survival space for letting the occupant live.

However, as for automobiles, there are a lot of types of bodies, some of which have a structure wherein the crushable zone is quite small as compared to the size of its vehicle cabin as the survival space.

In this type of automobile, for example,a so-called minivan, a low displacement car or the like, the longitudinal length of its crushable zone is quite short as compared to a sedan type automobile. That is, a relation L3>>L1, L2 is established as shown in FIG. 6.

Such an automobile, the crushable zone of which is short in the longitudinal direction, cannot have an allowance of deformation for absorbing the kinetic energy during a collision. Accordingly, the kinetic energy is not enough absorbed by the crushable zone, and the vehicle cabin is deformed beginning from the front thereof as shown in FIG. 7(a) so that there is a possibility of a crash of the survival space for the occupant. There is also a possibility of difficulty of protecting the occupant even when the occupant restraint protective device such as an air bag device or a seat belt device operates securely.

On the other hand, when a speed V2 of the vehicle immediately before the vehicle collides with an object (hereinafter, referred to as "the collision speed") is lower than a specific speed, the deformation of the crushable zone positioned in a front portion of the vehicle due to this collision does not extend to the vehicle cabin as shown in FIG. 7(b). Therefore, the occupant can be securely protected by the operation of the occupant restraint protective device such as an air bag device which is operated at a collision. It should be noted that the specific speed as a limit to which the deformation of the crushable zone can be restrained not to extend to the vehicle cabin is defined as a survival space ensuring speed Va (see FIGS. 7(a), 7(b)) in this specification.

OBJECT AND SUMMARY OF THE INVENTION

The object of the present invention is to provide a vehicle collision control system which, after predicting a collision in a manner known in the prior art, decelerates the vehicle to obtain a relation "the collision speed V2<the survival space ensuring speed Va" by successively braking while ensuring steady running of the vehicle, and outputs an inflator ignition signal for an air bag device only when an actual collision G is sensed by an impact sensor, thereby effectively operating the occupant restraint protective device such as an air bag device even when the crushable zone of the vehicle is short in the longitudinal direction as mentioned above.

For achieving the aforementioned object, the present invention is devised to, by detecting a distance between the vehicle and an object in front of the vehicle and a vehicle speed, decide whether the vehicle will collide with the object, compute an expected speed at the collision, and brake to make the speed at the collision lower than the survival space ensuring speed. The present invention is characterized by comprising a distance measuring sensor for sensing a distance between the vehicle and an object existing in the running direction, collision predictive means for predicting a collision based on a rate of distance change between the vehicle and the object and then outputting a collision predictive signal to a logic circuit when the collision is predicted, deceleration calculating means for calculating a first limit deceleration as the maximum deceleration within a range allowing the vehicle to run while braking without losing its stability, and a second limit deceleration for making a speed at the collision lower than a survival space ensuring speed, arithmetic processing means for successively comparing the first limit deceleration to the second limit deceleration which change according the running of the vehicle after the collision predictive signal is outputted and for outputting a braking start signal at a point when a predetermined comparative value is obtained, braking command means for commanding a predetermined braking force to braking means upon receiving the braking start signal from the arithmetic processing means, an impact sensor, and collision signal generating means for outputting a collision occurrence signal to the logic circuit when the impact sensor senses the collision, and in that when the collision predictive signal and the collision occurrence signal are both inputted to the logic circuit, the logic circuit outputs an ignition signal to an inflator of an air bag device.

It is preferable that the first limit deceleration is successively calculated considering a road condition obtained from the vehicle speed and a rotational speed of each wheel.

In addition, it is preferable that the second limit deceleration is successively calculated based on the relation between the distance from the vehicle to the object and the vehicle speed after the collision predictive signal is outputted, and is used for reducing the vehicle speed to the survival space ensuring speed before the collision.

Further, it is preferable that the predetermined comparative value is a threshold allowing the braking start signal to be outputted at least before the second limit deceleration exceeds the first limit deceleration.

It is preferable that when the second limit deceleration already exceeds the first limit deceleration at the time the collision predictive signal is outputted, the braking start signal is immediately outputted.

According to the present invention, the distance measuring sensor senses the distance between the vehicle and an object existing in the running direction of the vehicle and predicts a collision based on a rate of distance change between the vehicle and the object. When the collision is predicted, the collision predictive means outputs the collision predictive signal to the logic circuit. When the collision predictive signal is outputted, the deceleration calculating means calculates the first limit deceleration as the maximum deceleration within a range allowing the vehicle to run while braking without losing its stability, and a second limit deceleration for making a speed at the collision lower than a survival space ensuring speed. Then the arithmetic processing means successively compares the first limit deceleration to the second limit deceleration which change according to the running of the vehicle after the collision predictive signal is outputted, and outputs the braking start signal at a point when the predetermined comparative value is obtained. The braking commands means command the predetermined braking force to the braking means upon receiving the braking start signal from the arithmetic processing means. The collision signal generating means outputs the collision occurrence signal to the logic circuit when the impact sensor senses the collision. When the collision predictive signal and the collision occurrence signal are both inputted to the logic circuit, the logic circuit outputs the ignition signal to the inflator of the air bag device. As a result, after the collision is predicted, the secure quick braking is started to make the collision speed lower than the survival space ensuring speed which is unique to the vehicle. Therefore, since the collision speed can be made lower than the survival space ensuring speed, the deformation of the vehicle body can be restrained in the range of the crushable zone even which is small, thereby effectively protecting the occupant by the occupant restraint protective device such as an air bag device deployed in the survival space.

Since the first limit deceleration is successively calculated considering the road condition obtained from the vehicle speed and the rotational speed of each wheel, the vehicle never be inoperable by a steering wheel even during the quick braking, thereby braking the vehicle in the steady running state.

Since the second limit deceleration is successively calculated based on the relation between the distance from the vehicle to the object and the vehicle speed after the collision predictive signal is outputted, and is used for reducing the vehicle speed to the survival space ensuring speed before the collision, the deformation of the vehicle body at the collision can be restrained within a range allowing the survival space to be ensured.

Furthermore, the predetermined comparative value is a threshold allowing the braking start signal to be outputted at least before the second limit deceleration exceeds the first limit deceleration, thereby allowing the vehicle to run while braking without losing its stability even when the vehicle is quickly braked upon predicting the collision.

When the second limit deceleration already exceeds the first limit declaration at the time the collision predictive signal is outputted, the braking start signal is immediately outputted, thereby minimizing the breakage of the vehicle at the collision as possible.

DESCRIPTION OF THE PREFERRED EMBODIMENT

Hereinafter, an embodiment of a vehicle collision control system according to the present invention will be described in detail with reference to the attached drawings.

Figure 1:
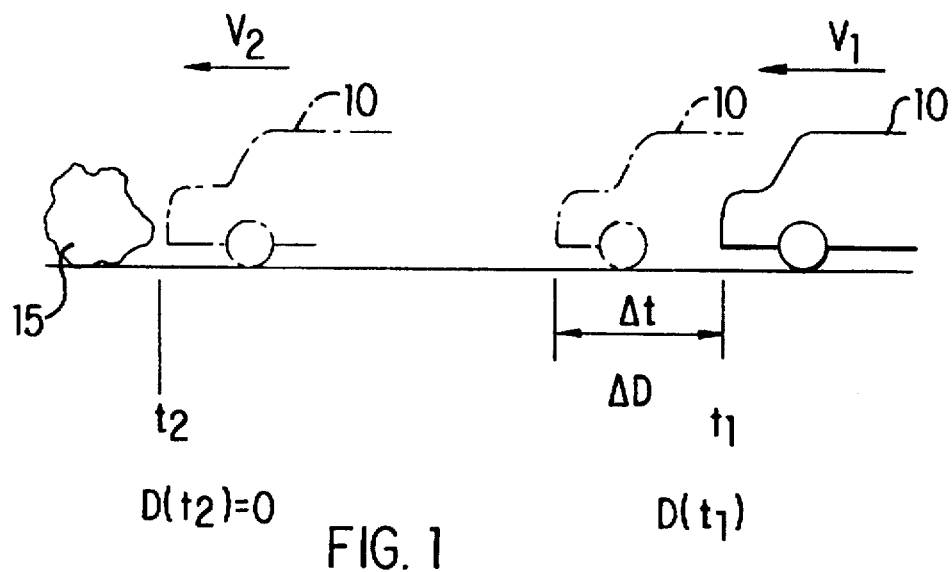
FIG. 1 is a view showing a positional relation between a running vehicle and an object for illustrating a vehicle collision control system according to the present invention.

FIG. 1 is a view of a positional relation schematically illustrating a running vehicle 10 which is in a position D(t1) at a time t1. According to the aforementioned well-known means used in the conventional collision predictive device, when an object 15 is sensed in front of the vehicle 10 running at a speed V1 at the time t1, the device measures a distance L between the vehicle 10 and the object 15 and the rate of change in the distance ΔD during a time period Δt, thereby computing an expected collision time t2 at which the vehicle collides with the object 15 and a collision speed V2.

The vehicle 10 shown in FIG. 1 is decelerated from the vehicle speed V1 to the collision speed V2 until the collision by quick braking based on braking command. When the deceleration ΔV by this quick braking excesses the acceptable maximum deceleration ΔVth as a first limit deceleration which changes corresponding to the condition of the running vehicle and the condition of the road surface, the vehicle wheels are locked and the driver can not control by the steering wheel so that the vehicle slips aside. Besides the collision with the object 15, another accident may be occurred by the side-slip.

The acceptable maximum deceleration ΔVth is calculated by detecting a wheel acceleration obtained from the sensed vehicle speed and the wheel rotational speeds, and considering conditions such as whether the vehicle is provided with an anti-skid brake system (ABS) (various systems have been already devised and performed). For improving the accuracy of the braking, the acceptable maximum deceleration ΔVth is preferably set considering data about the road surface condition obtained from the result of the wheel rotational speed.

On the other hand, as mentioned above, to restrain the deformation of the vehicle body at the collision within the range of the crushable zone, it is necessary to reduce the speed V1 to make the collision speed V2 at the moment of the collision (time t2) lower than the survival space ensuring speed Va or less. The survival space ensuring speed Va is unique to each type of body and the structure. Car manufacturers catch accurate values of the survival space ensuring speed Va for each type of vehicle by, such as, collision tests with real vehicles and numerical analysis with a computer.

When the speed at the time t1 is V1, it is necessary to calculate the desired deceleration ΔVr as the second limit deceleration which is needed to reduce the speed V1 to the survival space ensuring speed Va or less between the time t1 and the moment of the collision (time t2).

Figure 2:
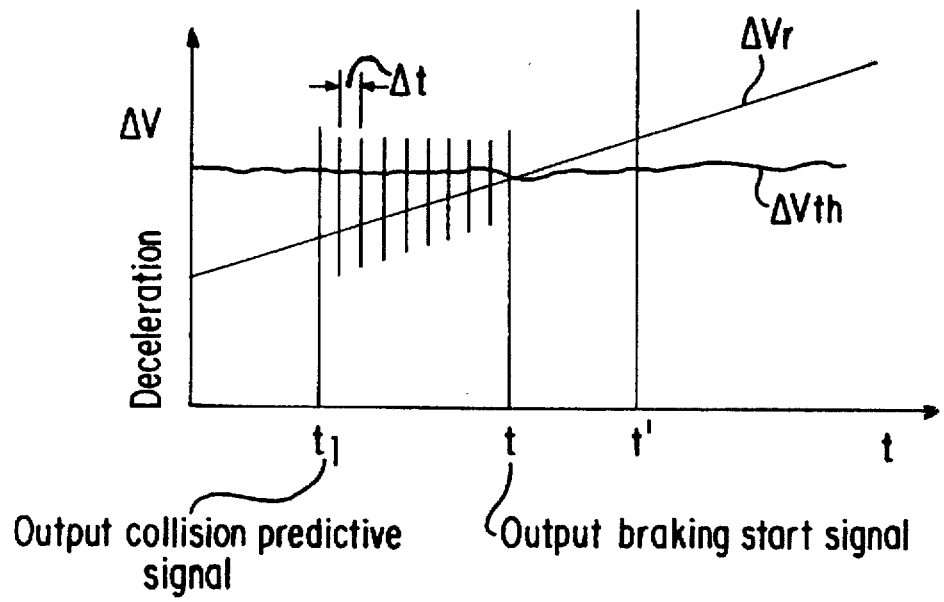
FIG. 2 is a graphical representation showing an example of changes of decelerations (acceptable maximum deceleration ΔVth and desired deceleration ΔVr) during running controlled by the vehicle collision control system of the present invention.

The shorter the distance between the vehicle 10 and the object 15, the larger the desired deceleration ΔVr. When the desired deceleration ΔVr exceeds the acceptable maximum deceleration ΔVth, it can not ensure its safety due to the quick braking. Therefore, the vehicle must be decelerated by fully braking at least a time when the second limit deceleration is equal to the desired deceleration ΔVr as shown in FIG. 2.

Figure 3:
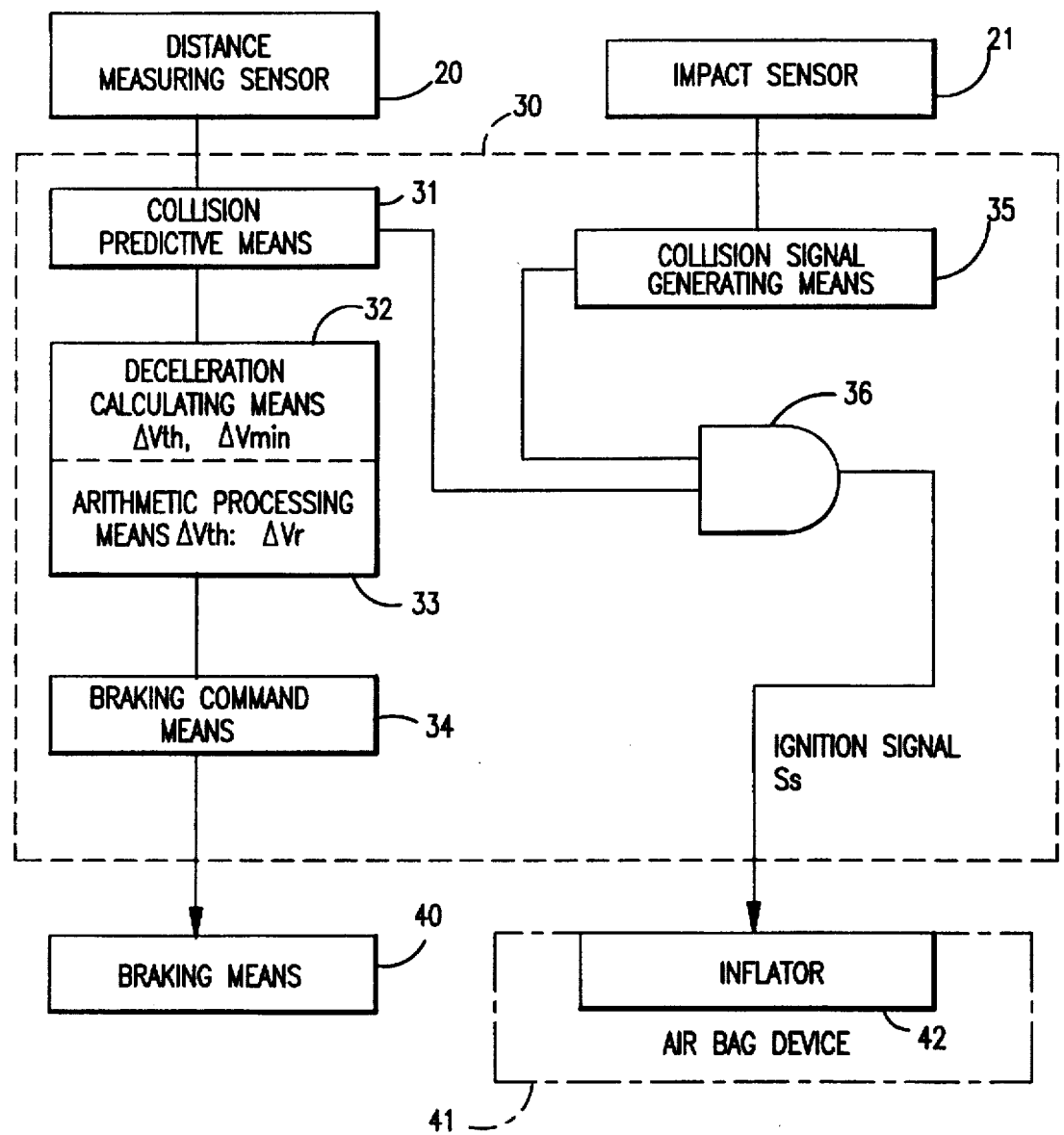
FIG. 3 is a block diagram showing one embodiment of the structure of the vehicle collision control system according to the present invention.

With reference to FIG. 3, the description will be made as regard to a control unit 30, one of the vehicle collision control system according to the present invention, having collision predictive means 31, deceleration calculating means 32, arithmetic processing means 33, braking command means 34, and collision signal generating means 35.

A distance measuring sensor 20 as an input unit for the collision predictive means 31 is mounted in the front portion of the vehicle body. The distance measuring sensor 20 senses the existence of an object in the running direction of the vehicle. The distance measuring sensor 20 may be an optical distance measuring sensor or an ultrasonic distance measuring sensor, which can search forward areas in the running direction at predetermined intervals and sense the distance between the vehicle and the object during running.

The distance data from the measuring sensor 20 is outputted to the control unit 30. The control unit 30 is provided with the collision predictive means 31. The collision predictive means 31 decides whether the vehicle will collide with the object by performing arithmetic on the distance data.

In the present invention, the collision predictive means 31 consists of the same logic as that of the aforementioned collision predictive means of the prior art. That is, the collision predictive means computes a distance between the vehicle and the forward object, and change in the speed of vehicle running toward the object based on the rate of distance change, considering the expected collision time and the maximum deceleration of the vehicle, and decides whether the vehicle will collides with the object. When the distance D between the vehicle and the object before the expected collision time is computed to be D=0, a collision predictive signal S1 is outputted to an logic circuit 36 which decides to generate the inflator ignition signal.

Upon generating the collision predictive signal S1 from the collision predictive means 31, the deceleration calculating means 32 calculate the acceptable maximum deceleration ΔVth which allows the vehicle to be prevented from slipping due to the locked state of the wheels. The deceleration calculating means 32 calculates wheel rotational speeds and wheel accelerations upon converting an analog rotational speed signal sensed by the wheel rotational speed sensor to a digital signal as mentioned above. It is detected that the wheels will be locked based on the wheel accelerations and the vehicle speed at this point. Then the deceleration calculating means 32 calculates the acceptable maximum deceleration ΔVth within the range in which the wheels may be never locked.

The deceleration calculating means 32 also sets the desired deceleration ΔVr which is needed to reduce the speed V1 to make the speed V2 lower than the survival space ensuring speed Va or less before the collision. That is, the deceleration calculating means 32 calculates the acceptable maximum deceleration ΔVth and the desired deceleration ΔVr at the time ti.

After the collision predictive signal S1 is outputted, the arithmetic processing means 33 performs comparison arithmetic between the acceptable maximum deceleration ΔVth and the desired deceleration ΔVr at the time ti at the predetermined interval (Δt) , and outputs a predetermined working command signal to the braking command means 34 using a threshold at which the desired deceleration ΔVr is equal to the acceptable maximum deceleration ΔVth. It should be understood that when the desired deceleration ΔVr already exceeds the acceptable deceleration ΔVth, the braking command signal is preferably outputted immediately (see t' in FIG. 2).

That is, the braking command signal is outputted to the braking command means 34 to keep the full-braking state in the range in which the acceptable maximum deceleration ΔVth is satisfied. Then the braking command means 34 outputs a driving signal to each drive of braking means 40 installed for each wheel. Since each of the braking means 40 comprises an electromagnetic valve and a brake actuator such as a hydraulic pump, the braking command means 34 outputs a solenoid driving signal for the electromagnetic valve (not shown) and a driving signal for a motor relay of the pump.

The vehicle is provided with an impact sensor 21 in the front portion thereof. The impact sensor 21 may be any type of acceleration G sensor well-known in the art, such as a seismic impact sensor which is of electric contact type or mechanical type. The impact sensor 21 is set in its sensitivity to sense an impact acceleration at the collision whereby the vehicle is broken. When the impact acceleration exceeds the threshold previously set in the sensor, the collision signal generating means 35 outputs the collision occurrence signal S2 to the logic circuit 36. The logic circuit 36 outputs an ignition signal Ss to the inflator 42 of the air bag device 41 only when both signals S1 and S2 are obtained upon receiving the collision predictive signal outputted from the collision predictive means 31.

Hereinafter, the description will be described with regard to the operational flow of the control unit 30 mentioned above with reference to the flow chart of FIG. 4.

Figure 4:
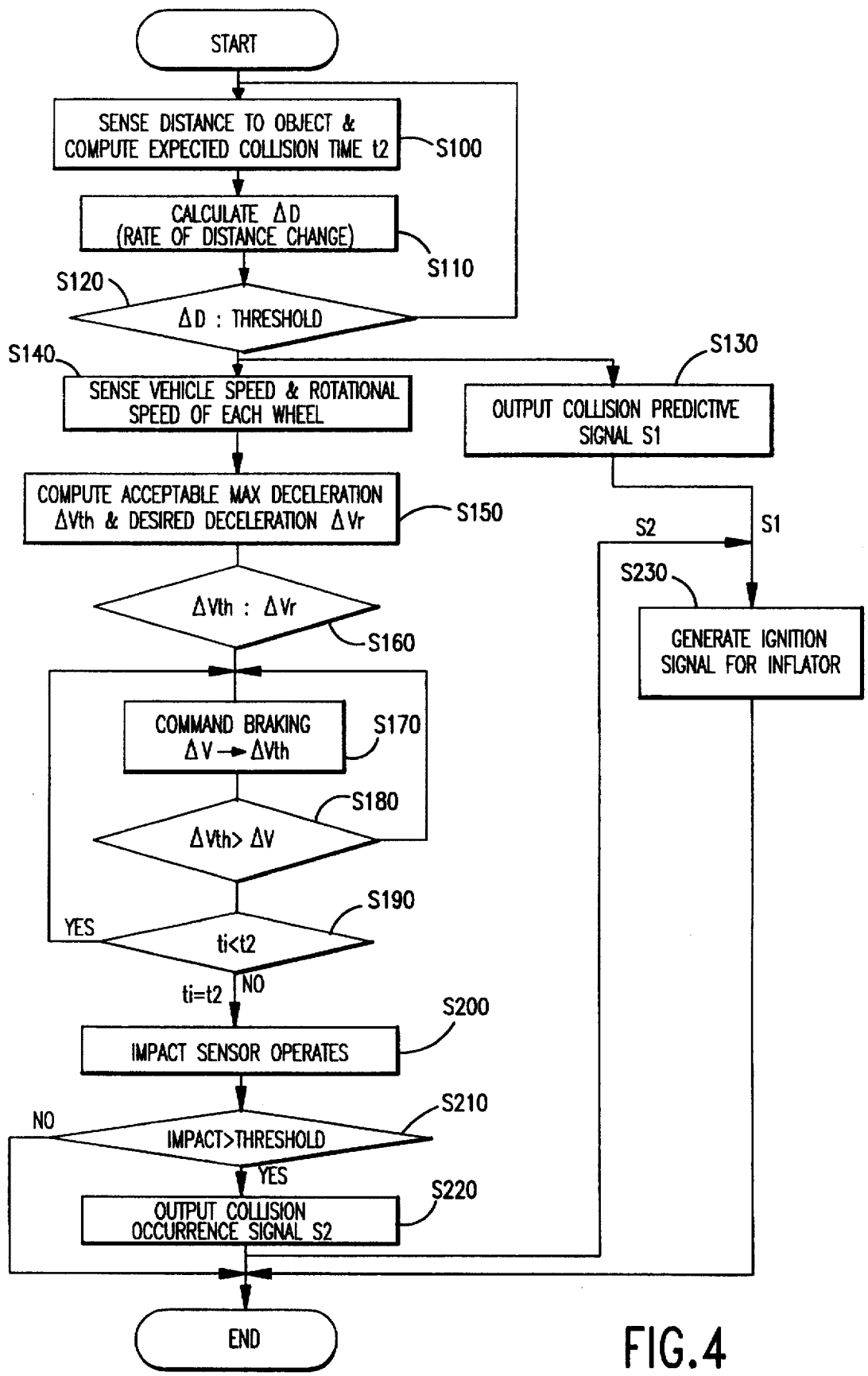
FIG. 4 is a flow chart showing an example of the decelerating operation by the vehicle collision control system according to the present invention.
Figure 5:
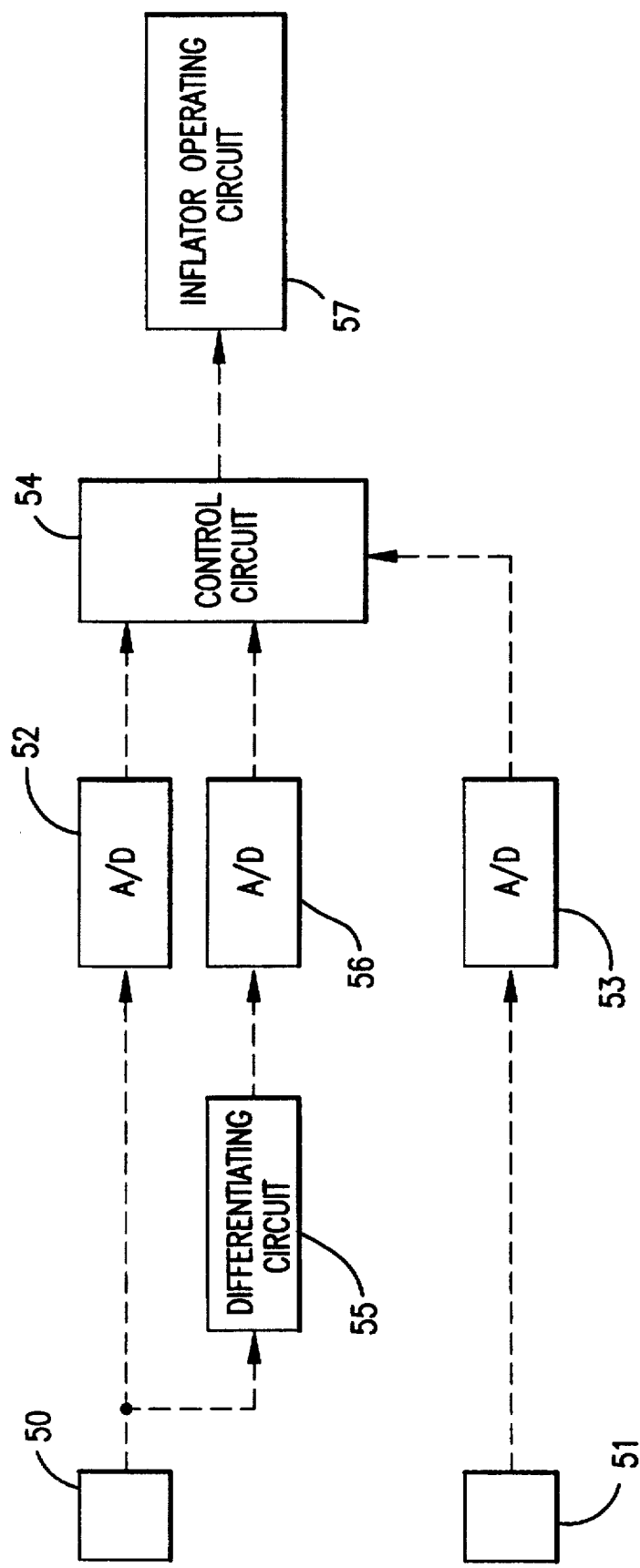
FIG. 5 is a block schematic diagram showing an example of conventional vehicle collision sensing device.
Figure 6:
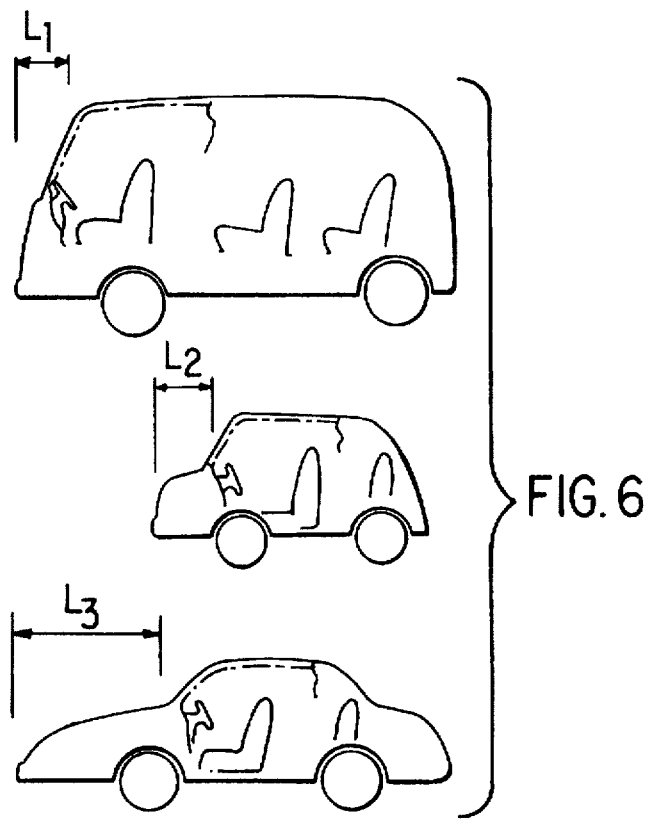
FIG. 6 is a schematic illustration showing a difference in size of a crushable zone among different types of automobiles.
Figure 7A:
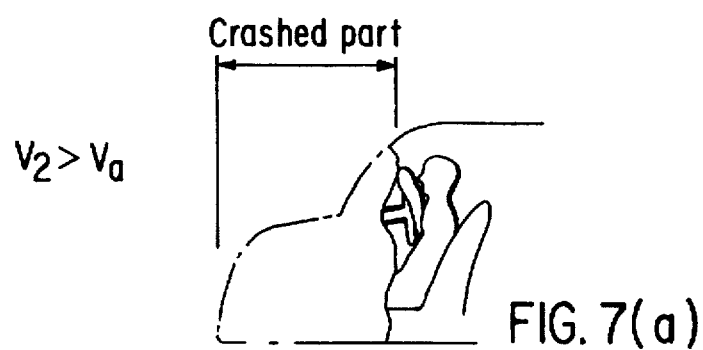
FIG. 7(a) and 7(b) are the schematics illustration showing the relation between the collision speed V2 and the survival space ensuring speed Va by using crashed states of a vehicle.
Figure 7B:
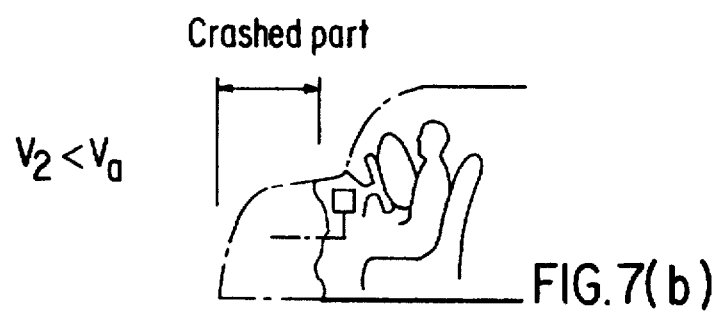

The distance measuring sensor 20 performs the sensing for an object at the predetermined time interval during running. When the distance measuring sensor 20 senses the object positioned to block the running direction of the vehicle, the operation of the collision control system according to the flow chart of FIG. 4 is started. The distance measuring sensor 20 also senses the distance D(t1) between the vehicle and the object 15 at the time t1 at when the object 15 is sensed and further computes the time t2 at when the vehicle will reach the object 15 (Step 100). The vehicle speed is sensed during the time period Δt, the rate of distance change ΔD between the vehicle and the object 15 (Step 110), and the comparison is performed between the rate of distance change ΔD and a collision occurrence threshold (Step 120). The collision occurrence threshold changes according to the driving condition set from the deceleration and the limit braking capacity of the vehicle. When it is decided that the rate of distance change ΔD exceeds the collision occurrence threshold, that is, that the collision time is earlier than a stopping time calculated by the rate of distance change ΔD, the collision occurrence is predicted. Therefore, the system can also recognize an unavoidable collision due to rapid approach of the object 15. When the collision occurrence is predicted, the collision predictive signal S1 is outputted to the logic circuit 36 (Step 130).

When the collision occurrence is predicted, the system senses each rotational speed of the wheels, calculates the wheel acceleration based on the detected signals, and further calculates the acceptable maximum deceleration ΔVth for ensuring steady running of the vehicle during quick braking, and the desired deceleration ΔVr which is needed to reduce the speed V1 to the survival space ensuring speed Va or less before the collision (Steps 140, 150).

Next, the arithmetic processing means 33 compares the acceptable maximum deceleration ΔVth to the desired deceleration ΔVr detected successively at the predetermined interval (Δt) (Step 160) and outputs the braking command signal to the braking command means 34 at least before the desired deceleration ΔVr exceeds the acceptable maximum deceleration ΔVth (Step 170). The braking command means 34 controls the braking force not to allow the actual deceleration ΔV to exceed the acceptable maximum deceleration ΔVth (Step 180). For example, when the steady running of the vehicle cannot be ensured due to the quick braking, the braking command means 34 outputs a brake actuator pressure reducing signal for decreasing the braking force so as to ensure the steady running of the vehicle while fully braked. In addition, when the braking deceleration is lower than the expected deceleration according to the relation with the desired deceleration ΔVr, the braking command means 34 output the brake actuator pressure intensifying signal for increasing the braking force so as to sufficiently brake the vehicle. In this manner, the actual deceleration ΔV is continuously held around the acceptable maximum deceleration ΔVth until the collision while the full-braking state is held. The process for controlling the speed loops the braking command until the time t2 in the control circuit 30 (Step 190).

When the vehicle 10 collides with the object 15 finally (at the time t2) (see FIG. 1), the impact sensor 21 positioned in the front portion of the vehicle senses the collision (Step 200). When the impact sensor 21 senses that the impact applied to the vehicle body is larger than the threshold (Step 210), the collision occurrence signal S2 is outputted to the logic circuit 36 (Step 220).

Only when the collision predictive signal S1 mentioned above and the collision occurrence signal S2 both are inputted to the logic circuit 36, the logic circuit 36 generates an ignition signal Ss for the inflator 42 of the air bag device 41 (Step 230).

Therefore, if the object 15 is a blown newspaper or the like, the collision occurrence signal S2 is not outputted so that the air bag can be prevented from being incorrectly deployed.

According to the present inventions the collision control system can securely ensure the effect of the occupant restraint protective device such as an air bag device even with the vehicle having the crushable zone of which is short in the longitudinal direction.

What I claim is:

1. A vehicle collision control system comprising:
   a distance measuring sensor for sensing a distance between a vehicle and an object existing in the running direction;
   collision predictive means for predicting a collision based on a rate of distance change between the vehicle and the object and then outputting a collision predictive signal to a logic circuit when the collision is predicted;
   deceleration calculating means for calculating a first limit deceleration as a maximum deceleration within a range allowing the vehicle to run while braking without losing its stability, and a second limit deceleration for making a speed at the collision lower than a survival space ensuring speed;
   arithmetic processing means for successively comparing said first limit deceleration to said second limit deceleration which change according to the running of the vehicle after said collision predictive signal is outputted and then outputting a braking start signal when a predetermined comparative value is obtained;

braking command means for commanding a predetermined braking force to braking means upon receiving the braking start signal from said arithmetic processing means;

an impact sensor; and collision signal generating means for outputting a collision occurrence signal to said logic circuit when said impact sensor senses the collision, wherein when the collision predictive signal and the collision occurrence signal both are inputted to said logic circuit, said logic circuit outputs an ignition signal to an inflator of an air bag device.

2. A vehicle collision control system as claimed in claim 1, wherein said first limit deceleration is successively calculated considering a road condition obtained from the vehicle speed and a rotational speed of each wheel.

3. A vehicle collision control system as claimed in claim 1, wherein said second limit deceleration is successively calculated based on a relation between the distance between the vehicle and the object and the vehicle speed after said collision predictive signal is outputted and is used for reducing the vehicle speed to said survival space ensuring speed before the collision.

4. A vehicle collision control system as claimed in claim 1, wherein said predetermined comparative value is a threshold allowing said braking start signal to be outputted at least before the second limit deceleration exceeds said first limit deceleration.

5. A vehicle collision control system as claimed in claim 1, wherein when said second limit deceleration already exceeds said first limit declaration at the time said collision predictive signal is outputted, said braking start signal is immediately outputted.

\* \* \* \* \*